J. G. HODGSON.
FRICTION TOP CAN.
APPLICATION FILED OCT. 29, 1913.

1,251,027.

Patented Dec. 25, 1917.

Witnesses:
Wm. Geiger
Esther Abrams.

Inventor:
John G. Hodgson
By
Munday, Evarts, Adcock & Clarke
Attys.

UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW JERSEY.

FRICTION-TOP CAN.

1,251,027.  Specification of Letters Patent.  Patented Dec. 25, 1917.

Application filed October 29, 1913. Serial No. 797,975.

*To all whom it may concern:*

Be it known that I, JOHN G. HODGSON, a citizen of the United States, residing in Maywood, in the county of Cook and State of Illinois, have invented a new and useful Improvement in Friction-Top Cans, of which the following is a specification.

This invention relates to improvements in friction top cans.

One object of the invention is to provide a can or container which is doubly sealed by means of a hermetic gasket seal and a friction seal, the hermetic seal being maintained by the coöperating friction sealing surfaces.

The invention furthermore consists in the improvements in the parts and devices and in the novel combination of the parts and devices as herein shown, described or claimed.

Figure 1:
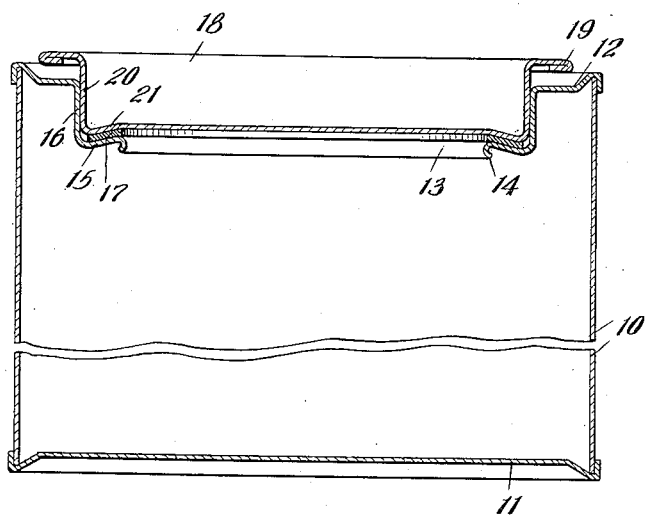
Figure 2:
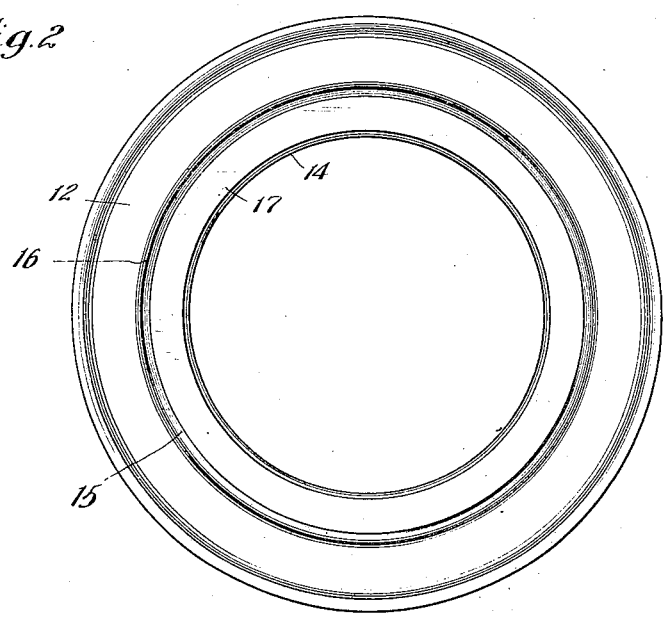

In the drawing forming a part of this specification, Figure 1 is a vertical, diametrical section of a sheet metal can embodying my improvements and Fig. 2 is a top plan view of the can body shown in Fig. 1, the cover being removed.

In said drawing, the body is designated by the reference 10, the same having a bottom 11 and top 12 secured thereto in any of the well-known ways. The top 12, as shown, is provided with a central opening 13 defined by a downwardly and inwardly curled edge 14. Surrounding the curled edge 14 is an inclined gasket supporting shelf or ledge 15 and concentric therewith is a substantially, vertically extending friction seat wall 16. An annular gasket 17, of paper, rubber or other suitable material, is placed upon the shelf 15 and is held under compression by means of a friction cover 18 having a pryoff rim 19, substantially vertical friction seat wall 20 coöperable with the wall 16, and upwardly inclined surface 21 at the bottom of the wall 20.

As will be understood, the coöperating friction seat walls 16 and 20 form a friction seal for the can and the friction between these surfaces also holds the cover in position after the same is pressed home to compress the gasket 17 so that the can is doubly sealed by means of a hermetic gasket seal and friction seal. The curled inner edge 14 of the can top is useful in wiping off paint brushes when the can is used for paint, and furthermore said curled edge materially strengthens the countersunk can top to prevent the friction seat wall 16 thereof from yielding or springing outwardly when the cover is forced into place.

Although I have herein shown and described what I now consider the preferred embodiment of my improvements, yet it will be understood that various changes and modifications may be made without departing from the spirit of the invention, and all such changes and modifications are contemplated as come within the scope of the claim appended hereto.

I claim:

A friction top can of the character described including, in combination: a body having a top provided with a central opening, said top having an inwardly and downwardly curled inner brush-stripping edge surrounding the opening, an inclined gasket-supporting shelf and a substantially vertical internal friction seat wall; an annular gasket mounted on said shelf and a cover having an external friction seat wall coöperable with the friction seat wall of the top and an upwardly inclined portion adapted to be seated on said gasket to thereby compress it, substantially as specified.

Signed this 9th day of October, 1913, in the presence of two witnesses.

JOHN G. HODGSON.

Witnesses:
JOSEPH HARRIS,
WILLIAM A. GEIGER.